United States Patent
Lee et al.

(10) Patent No.: US 9,234,550 B2
(45) Date of Patent: Jan. 12, 2016

(54) ACTUATOR FOR CLUTCH

(71) Applicants: Hyundai Motor Company, Seoul (KR); KEYANG ELECTRIC MACHINERY CO., LTD., Seoul (KR); Pyeong Hwa VALEO CO., LTD, Dae-gu (KR)

(72) Inventors: Hee Ra Lee, Anyang-si (KR); Baekyu Kim, Suwon-si (KR); Yeonho Kim, Suwon-si (KR); Man-Dae Hur, Daegu (KR); Hongchcol Moon, Daegu (KR); Jinho Jang, Suwon-si (KR); Wookyo Jang, Hwaseong-si (KR); Jungchul Kim, Cheonan-si (KR); Namhun Lee, Pyeongtaek-si (KR)

(73) Assignees: Hyundai Motor Company, Seoul (KR); Keyang Electric Machinery CO., LTD., Dae-gu (KR); Pyeong Hwa Valeo CO., LTD., Seoul (KR)

( * ) Notice: Subject to any disclaimer, the term of this patent is extended or adjusted under 35 U.S.C. 154(b) by 249 days.

(21) Appl. No.: 13/705,617

(22) Filed: Dec. 5, 2012

(65) Prior Publication Data

US 2013/0146417 A1  Jun. 13, 2013

(30) Foreign Application Priority Data

Dec. 9, 2011 (KR) .......................... 10-2011-0132266

(51) Int. Cl.
*F16D 23/12* (2006.01)
*F16D 28/00* (2006.01)
*F16H 25/20* (2006.01)

(52) U.S. Cl.
CPC ............... *F16D 23/12* (2013.01); *F16D 28/00* (2013.01); *F16H 25/20* (2013.01); *F16D 2023/123* (2013.01); *F16H 2025/204* (2013.01); *F16H 2025/2075* (2013.01)

(58) Field of Classification Search
CPC ................... F16D 2023/123; F16H 2025/204; F16H 2025/2075
USPC .......................... 192/84.6, 84.7, 94; 188/157
See application file for complete search history.

(56) References Cited

U.S. PATENT DOCUMENTS

| 2,504,018 | A | * | 4/1950 | Gibson et al. | 192/48.1 |
| 3,161,074 | A | * | 12/1964 | Korthaus et al. | 74/89.34 |
| 4,766,985 | A | * | 8/1988 | Brusasco | 192/84.6 |
| 6,848,557 | B2 | * | 2/2005 | Kapaan et al. | 192/84.6 |
| 8,821,346 | B2 | * | 9/2014 | Kim et al. | 477/174 |

FOREIGN PATENT DOCUMENTS

| JP | 10-82432 A | 3/1998 |
| JP | 11-13878 A | 1/1999 |
| KR | 2002-0038484 A | 5/2002 |
| KR | 10-0625877 B1 | 9/2006 |

* cited by examiner

*Primary Examiner* — Robert Hodge
*Assistant Examiner* — Ryan Dodd
(74) *Attorney, Agent, or Firm* — Morgan, Lewis & Bockius LLP

(57) ABSTRACT

An actuator apparatus for a clutch that operates the clutch of a transmission according to operation of a motor, may include the motor including a stator and a rotator, wherein the rotator has a drive shaft and a rotator core receiving the drive shaft therein, a lead screw engaged to the drive shaft of the motor and movable in a length direction thereof according to the operation of the drive shaft in the motor, a rod disposed apart from the lead screw, a slider connecting the lead screw with the rod, and a guide rail disposed to contact with the slider and guiding a linear motion of the slider.

7 Claims, 3 Drawing Sheets

ACTUATOR FOR CLUTCH

CROSS-REFERENCE TO RELATED APPLICATION

The present application claims priority to Korean Patent Application No. 10-2011-0132266 filed in the Korean Intellectual Property Office on Dec. 9, 2011, the entire contents of which is incorporated herein for all purposes by this reference.

BACKGROUND OF THE INVENTION

1. Field of the Invention

The present invention relates to an actuator of a clutch, and more particularly to an actuator for operating a clutch in a transmission of an electric vehicle.

2. Description of Related Art

Generally, an actuator converts electrical energy, hydraulic energy or pneumatic energy to a mechanical energy. The actuator is used to operate a clutch of a transmission.

In a case of a manual transmission, a clutch control system of a clutch release cylinder type or concentric sleeve cylinder type is used.

In the clutch release cylinder type, if a driver pushes a clutch pedal, hydraulic pressure is generated in a clutch master cylinder and a tappet of a clutch release cylinder is operated by the generated hydraulic pressure.

At this time, the tappet pushes a clutch release fork so as to move a clutch release bearing in an axial direction. After that, the clutch release bearing moved in the axial direction operates a clutch diaphragm spring.

In a case of an automatic transmission, a clutch actuator is adapted to engage and release the clutch automatically. The clutch actuator of the automatic transmission receives a signal from an electric control unit (ECU) so as to operate the clutch. The clutch actuator has a master cylinder, a device for converting a motion direction and a motor.

The master cylinder is connected to a slave cylinder disposed around a release device of the clutch. The device for converting a motion direction includes a rod, a worm wheel and a worm gear. The rod contacts with a piston of the master cylinder. The worm wheel is fixed to an end portion of the rod. The worm gear is coupled to the worm wheel and is fixed to a rotating shaft of a motor. That is, if the motor rotates, the worm wheel is rotated by rotation of the worm gear. Thereby, the rod is moved linearly and the piston of the master cylinder is operated. Therefore, the hydraulic pressure is supplied from the master cylinder to the slave cylinder, and the slave cylinder is adapted to operate the release device so as to engage or release the clutch.

However, since the number of the components including conventional clutch actuators is many, a cost may be increased and a spatial utility may be deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an actuator for a clutch having advantages of reducing cost and increasing fuel economy and spatial utility.

In an aspect of the present invention, an actuator apparatus for a clutch that operates the clutch of a transmission according to operation of a motor, may include the motor including a stator and a rotator, wherein the rotator may have a drive shaft and a rotator core receiving the drive shaft therein, a lead screw engaged to the drive shaft of the motor and movable in a length direction thereof according to the operation of the drive shaft in the motor, a rod disposed apart from the lead screw, a slider connecting the lead screw with the rod, and a guide rail disposed to contact with the slider and guiding a linear motion of the slider.

The drive shaft of the motor is formed with a cylindrical shape having an interior circumference and an exterior circumference.

A screw thread is formed at an exterior circumference of the lead screw and a screw thread is formed at a portion of the interior circumference of the drive shaft to be engaged with the lead screw and to move the lead screw linearly in the length direction by rotation of the drive shaft.

The lead screw and the rod are coaxially disposed.

The actuator apparatus may further may include an elastic member that is disposed inside the drive shaft of the motor and elastically biases the lead screw.

The actuator apparatus may further may include a cam that is coupled to the lead screw positioned outside the motor.

The guide rail is disposed in the length direction of the lead screw.

The slider may include a side surface to which the lead screw is rotatably coupled, the other side surface coupled to the rod, and an upper surface and a lower surface connecting the side surface and the other side surface.

The guide rail is disposed to slidably contact with at least one of the upper surface and the lower surface of the slider.

The actuator apparatus may further may include a gap forming portion that is connected with the slider and the rod respectively and connects the slider and the rod with a space formed therebetween such that the rod moves upwardly or downwardly.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
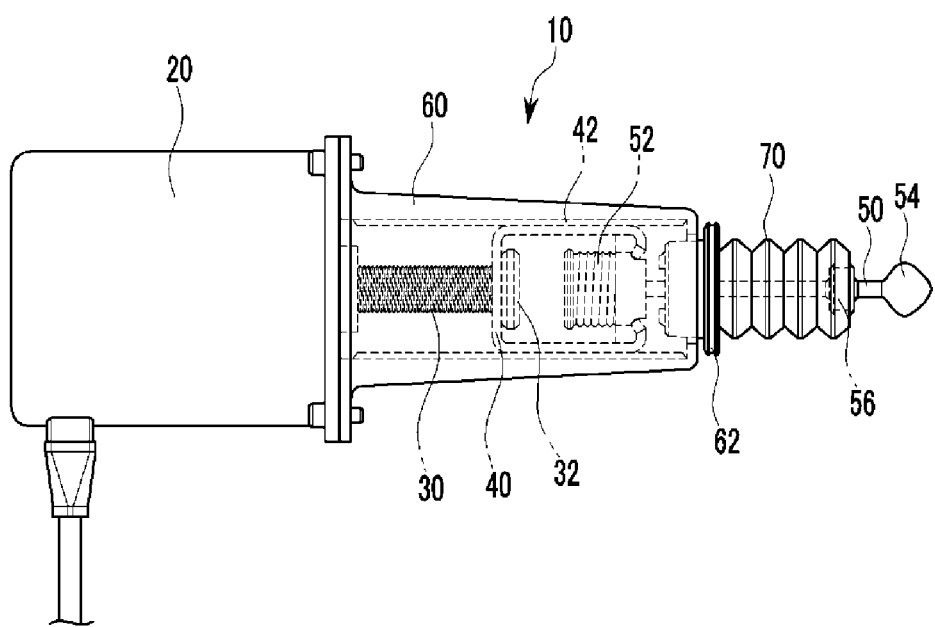
FIG. 1 is a schematic diagram of an actuator for a clutch according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a schematic diagram of an actuator for a clutch according to an exemplary embodiment of the present invention.

As shown in FIG. 1, an actuator 10 for a clutch includes a motor 20, a case 60, a lead screw 30, a rod 50, a slider 40 and a guide rail 42.

The motor 20 is adapted to generate power for operating the actuator 10. That is, the actuator 10 is operated according to operation of the motor 20.

Components such as the lead screw 30, the slider 40, the guide rail 42 and so on can be disposed in the case 60. The case 60 is coupled and fixed to the motor 20.

The lead screw 30 moves linearly in a length direction thereof according to the operation of the motor 20. In addition, some portion of the lead screw 30 is coupled to the drive shaft of the motor 20.

The rod 50 moves in the length direction together with the lead screw 30. The rod 50 and the lead screw 30 are disposed on the same axis. Some portion of the rod 50 is disposed in the case 60, and the other portion of the rod 50 is disposed at an outside of the case 60.

And, a boot 70 is disposed on the rod 50 for protecting the rod 50 disposed at the outside of the case 60. A first support portion 56 and a second support portion 62 are disposed apart from each other on the rod 50 in the length direction, and support both end portions of the boot 70.

The slider 40 is adapted to guide the lead screw 30 and the rod 50 such that the lead screw 30 and the rod 50 easily move in the length direction. That is, the slider 40 is disposed between the lead screw 30 and the rod 50 and connects the lead screw 30 with the rod 50. Therefore, the lead screw 30, the slider 40 and the rod 50 integrally move according to the length direction of the lead screw 30.

The slider 40 has a side surface coupled to the lead screw 30, the other side surface coupled to the rod 50, and an upper surface and a lower surface connecting the side surface and the other side surface.

The guide rail 42 is adapted to guide the slider 40 such that the slider 40 easily moves. The guide rail 42 can be fixedly provided at the upper surface and/or the lower surface of the slider 40 in the case 60. That is, the guide rail 42 is adapted to contact with at least one of the upper surface and the lower surface of the slider 40. The guide rail 42 is disposed in the length direction of the lead screw, and accordingly, the slider 40 moves in a moving direction of the lead screw according to the guide rail 42.

A catching portion 32 is disposed on the lead screw 30 so as to prevent the slider 40 from being separated from the lead screw 30. The catching portion 32 is coupled to the end portion of the lead screw 30 connected to the slider 40.

Figure 2:
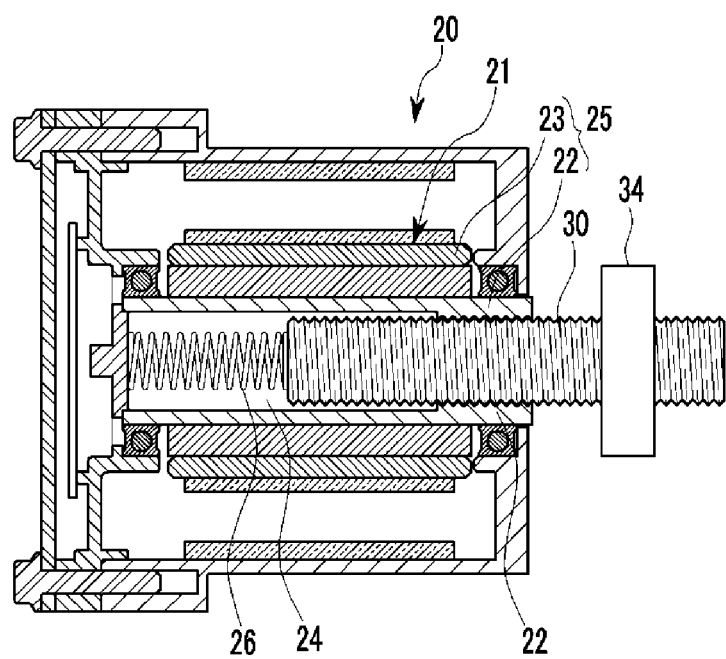
FIG. 2 is a cross-sectional view of a motor according to an exemplary embodiment of the present invention.

FIG. 2 is a cross-sectional view of a motor according to an exemplary embodiment of the present invention.

As shown in FIG. 2, the motor 20 generates a rotating force by a stator 21 formed with a ring shape and a rotator 25 including a drive shaft 22 disposed in the stator and a rotator core 23 disposed at an exterior circumference of the drive shaft 22. The drive shaft 22 of the motor 20 is formed with a cylindrical shape having an interior circumference and an exterior circumference. In addition, a lead screw receiving hole 24 is a hole portion of the drive shaft 22 of the motor in which some portion of the lead screw 30 inserted.

A screw thread is formed at some portion of an interior circumference of the drive shaft 22. In addition, a screw thread is formed at an exterior circumference of the lead screw 30. Therefore, if the motor 20 is driven, the lead screw 30 moves in the length direction along the screw thread of the drive shaft according to the rotation of the drive shaft 22. In addition, since the drive shaft 22 can rotate in both directions, the lead screw 30 can reciprocate linearly in the length direction.

An elastic member 26 is disposed in the lead screw receiving hole 24. The elastic member 26 is connected to an end portion of the lead screw 30. Therefore, the elastic member 26 can reduce a driving torque of the motor 20 and efficiently move the lead screw 30 linearly by using elastic force thereof.

A cam 34 is disposed at the other portion of the lead screw 30 that is not inserted in the motor 20. And, since the cam 34 increases rotational inertia of the lead screw, the cam 34 can reduce the drive torque of the motor 20.

Figure 3:
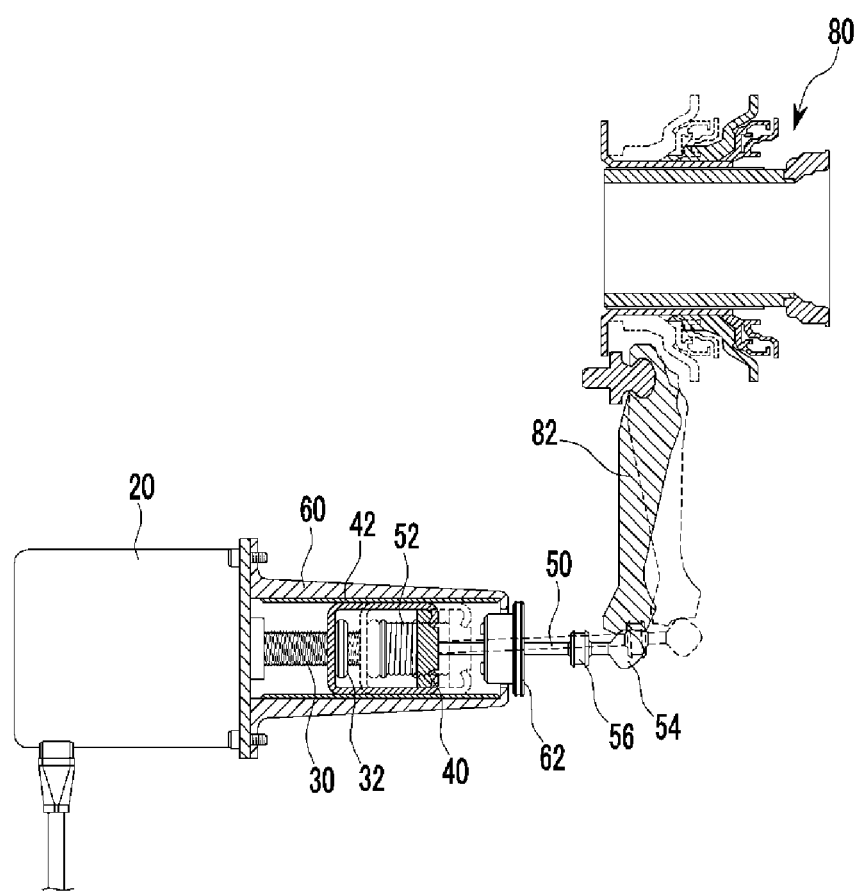
FIG. 3 is a schematic diagram showing operation of an actuator for a clutch according to an exemplary embodiment of the present invention.

FIG. 3 is a schematic diagram showing operation of an actuator for a clutch according to an exemplary embodiment of the present invention.

As shown in FIG. 3, the rod 50 includes a connecting portion 54 and a gap forming portion 52.

The connecting portion 54 is disposed at an end portion of the rod 50. That is, the connecting portion 54 is formed at a portion of the rod which is not covered by the boot 70 and is disposed at the outside of the case 60. And, the connecting portion 54 can contact with a connecting lever 82 coupled to a clutch 80. That is, if the rod 50 moves linearly, the connecting portion 54 contacts with the connecting lever 82 and then moves the connecting lever. Accordingly, the clutch 80 is operated by the lever motion of the connecting lever 82. Also, since the rod 50 can reciprocate linearly, the clutch 80 can be engaged or released.

The gap forming portion 52 is disposed at a portion where the rod 50 and the slider 40 are connected.

The gap forming portion 52 is respectively connected with the slider 40 and the rod 50 and connects the slider 40 and the rod 50 with a space formed therebetween such that the rod 50 moves upwardly or downwardly. The rod 50 pitches in a vertical direction to the length direction because of the lever motion of the connecting lever 82 rotating about a one point. Accordingly, the gap forming portion 52 compensates a pitch of the rod 50.

According to an exemplary embodiment of the present invention, since the number of the components decreases, a cost may be reduced. Also, since the lead screw is used, a spatial utility may be improved. In addition, the clutch 80 needs not an additional energy for coupling. Therefore, fuel economy may be improved.

For convenience in explanation and accurate definition in the appended claims, the terms "upper", "lower", "inner", "outer", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An actuator apparatus for a clutch that operates the clutch of a transmission according to operation of a motor, comprising:
    the motor including a stator and a rotator, wherein the rotator has a drive shaft and a rotator core receiving the drive shaft therein, and wherein the drive shaft of the motor is formed with a cylindrical shape having an interior circumference and an exterior circumference;
    a lead screw engaged to the drive shaft of the motor and movable in a length direction thereof according to the operation of the drive shaft in the motor;
    a rod disposed apart from the lead screw;
    a slider continuously connecting the lead screw with the rod;
    a guide rail disposed to contact with the slider and guiding a linear motion of the slider;
    an elastic member disposed inside the drive shaft of the motor and elastically biasing the lead screw; and
    a cam coupled to the lead screw positioned outside the motor.

2. The actuator apparatus of claim 1, wherein a screw thread is formed at an exterior circumference of the lead screw and a screw thread is formed at a portion of the interior circumference of the drive shaft to be engaged with the lead screw and to move the lead screw linearly in the length direction by rotation of the drive shaft.

3. The actuator apparatus of claim 1, wherein the lead screw and the rod are coaxially disposed.

4. The actuator apparatus of claim 1, wherein the guide rail is disposed in the length direction of the lead screw.

5. The actuator apparatus of claim 1, wherein the slider includes a side surface to which the lead screw is rotatably coupled, the other side surface coupled to the rod, and an upper surface and a lower surface connecting the side surface and the other side surface.

6. The actuator apparatus of claim 5, wherein the guide rail is disposed to slidably contact with at least one of the upper surface and the lower surface of the slider.

7. The actuator apparatus of claim 5, further including a gap forming portion that is connected with the slider and the rod respectively and connects the slider and the rod with a space formed therebetween such that the rod moves upwardly or downwardly.

* * * * *